United States Patent
Vartanian et al.

[15] 3,657,584
[45] Apr. 18, 1972

[54] CONTACT DEVICE

[72] Inventors: Gurgen Petrosovich Vartanian, Budapeshtskaya ulitsa, 15, korpus 2, kv. 29; Garri Mikhailovich Khutoretsky, Altaiskaya ulitsa, 20, kv. 5; Lidia Semenovna Likhota, Pulkovskaya ulitsa, 19, kv. 102, all of Leningrad, U.S.S.R.

[22] Filed: July 27, 1970

[21] Appl. No.: 58,614

[52] U.S. Cl. ........................................... 310/232, 310/233
[51] Int. Cl. ......................................................... H02k 32/08
[58] Field of Search ................. 310/232, 231, 233, 234, 236, 310/219, 223, 226

[56] References Cited

UNITED STATES PATENTS

| | | | |
|---|---|---|---|
| 1,281,862 | 10/1918 | Siegfried et al. | 310/232 |
| 1,493,859 | 5/1928 | Himes | 310/232 |
| 3,185,878 | 5/1965 | Reisnecker | 310/232 |

FOREIGN PATENTS OR APPLICATIONS 1,166,601  11/1958  France ................................... 310/233

Primary Examiner—J. D. Miller
Assistant Examiner—R. Skudy
Attorney—Waters, Roditi, Schwartz & Nissen

[57] ABSTRACT

A contact device for an electric machine wherein electric current flows through a distributing ring having secured thereto a current conducting bar and a slip ring, there being interposed intermediate of said distributing ring and said slip ring an electrically conductive gasket extending symmetrically in opposite directions from both sides of said current conducting bar. The electric conductivity of said gasket increasing in opposite directions from the central line of said current conducting bar, the circumferential extent of said gasket being less than half the circumference of the adjacent side of said distributing ring.

1 Claims, 4 Drawing Figures

CONTACT DEVICE

The present invention relates to contact devices for electric machines such as generators of high-power turbine-generator plants.

In known electric machines, such as the generators of turbine-generator plants, a contact device may be constituted by a main slip ring adapted to be slidably engaged in operation by the contact brushes of the machine and a distributing ring having attached thereto a current-conducting bar electrically connected with the winding of the rotor of the machine. The distributing ring is of a generally flat shape and is secured to the face end of the slip ring. In order to provide for uniform distributing of electric current throughout the slip ring driving operation of the machine and, consequently, for uniform distribution of the current among the contact brushes, in some of the known generators of high-power turbine-generator plants the slip rings are each provided with two distributing rings mounted at both end faces of the slip ring and electrically connected to each other. This known structure is subject to serious disadvantages.

This known structure of the contact devices is not free from serious disadvantages.

In these contact devices, electric current flows through the current-conducting bars and the distributing ring toward the main slip ring, the current flowing, as is widely known, along the shortest path possible whereby it is non-uniformly distributed throughout the slip ring. More particularly it is concentrated mainly in the portion of the slip ring, which is adjacent the current-conducting bar and, consequently, the current is non-uniformly distributed among the contact brushes. In the generators of high-power turbine-generator plants the above situation leads, when the excitation current is sufficiently great, to non-uniform heating of the slip ring, to overheating of the portion of the slip ring adjacent the current-conducting bar, and to eventual deformation of this portion; there may also occur an increased vibration of the slip ring. All this eventually results in untimely wear and unwanted heating of the slip ring and of the contact brushes, which curtails the operational life of the above components. Moreover, excessive heating of a slip ring affects the tension fit of the slip ring about the rotor shaft, which might lead to a breakdown of the generator.

It is an object of the present invention to eliminate these disadvantages.

One main object of the present invention is to provide a reliably operating contact device for an electric machine, the reliability being attained by causing the electric current flowing toward the slip ring from the current-conducting bar to be substantially uniformly distributed throughout the slip ring.

Comprising a current conducting bar in electrical contact with a distributing ring and a slip ring mechanically connected with said distributing ring, said contact device, in accordance with the present invention, having said current conducting bar secured to said distributing ring, there being provided intermediate said distributing ring and said slip ring an electrically conductive gasket means, said gasket means extending symmetrically at both sides of said current conducting bar, the circumferential extent of said gasket means being less than half the circumference of the adjacent side of said distributing ring.

It is advantageous, in accordance with one feature of the invention, for said gasket means to be of a varying electric conductivity increasing in opposite directions from the central line of said current conducting bar.

In a contact device, constructed in accordance with the present invention, electric current is distributed substantially uniformly throughout the entire slip ring, which prevents deformation and vibration of the slip ring and reduces heating of the slip ring and of the contact brushes, whereby the tension fit of the slip ring about the shaft of the electric machine, supporting said ring, is not affected. Wearing away of the associated contact brushes is also reduced. Moreover, the electric current becomes substantially uniformly distributed among the contact brushes. All this prolongs the operational life of the electric machine incorporating said contact device and increases the reliability of its performance.

Contact devices, constructed in accordance with the present invention, have been experimentally tested in the structures of the generators of turbine-generator plants of 300,000 kW., 500,000 kW., 800,000 kW. and 1,000,000 kW. capacities. Such devices may also be incorporated, for example, in the generators of 2,000,000 kW. turbine-generator plants.

The present invention will be better understood from the following detailed description of two embodiments thereof, with reference being made to the accompanying drawings wherein.

Figure 1:
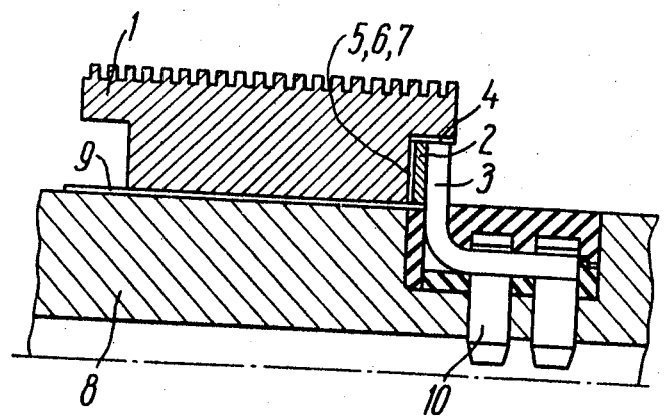
FIGS. 1 and 2 show schematically a contact device with a flat distributing ring, constructed in accordance with a first embodiment of the present invention.
Figure 2:
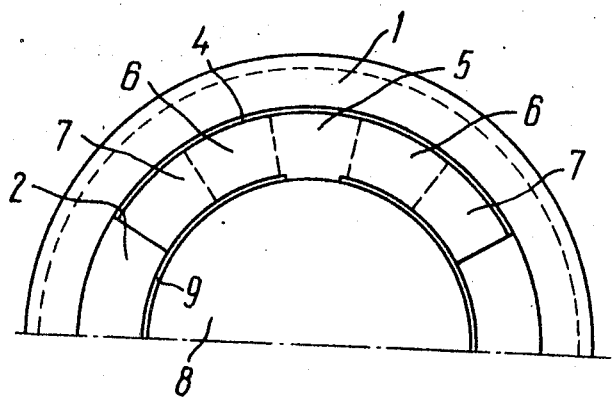

Referring now in particular to the appended drawings, a contact device (FIGS. 1 and 2), constructed in accordance with the present invention, comprises a slip ring 1 adapted to be slidably engaged in operation by the contact brushes (not shown in the drawings) of an electric machine incorporating the device, and a flat distributing ring 2 mounted adjacent the end face of the slip ring 1.

A current conducting bar 3 is secured to the distributing ring 2 and is electrically insulated from the slip ring 1 by means of a gasket 4. Mounted intermediate of the slip ring 1 and the distributing ring 2 are electrically conductive gaskets 5, 6 and 7 shaped as segments and extending symmetrically at both sides of the central line of the current-conducting bar 3, adjacent the external surface of the distributing ring 2. The respective materials of the gaskets 5, 6 and 7 have different values of electrical conductivity, the material of the gasket 5, which is in a direct contact with the current-conducting bar 3, having the lowest electrical conductivity of the three, and the electrical conductivity of the material of the gasket 7 being greater than that of the material of the gasket 6, i.e. the electrical conductivity of the respective gaskets increases in a direction away from the bar 3.

As in known contact devices of existing electric machines, the slip ring 1 is insulated from the rotor shaft 8 of the machine by insulating means 9, and the current conducting bar 3 is connected to bolts 10 which are electrically connected with the rotor winding.

When the excitation winding of the machine (not shown) is supplied with electric current, the latter flows from the slip ring 1 to the distributing ring 2 through the gaskets 5, 6 and 7. The different values of the electrical conductivity of the gaskets 5, 6 and 7 bring about uniform distribution of current among all gaskets 5, 6 and 7.

Figure 3:
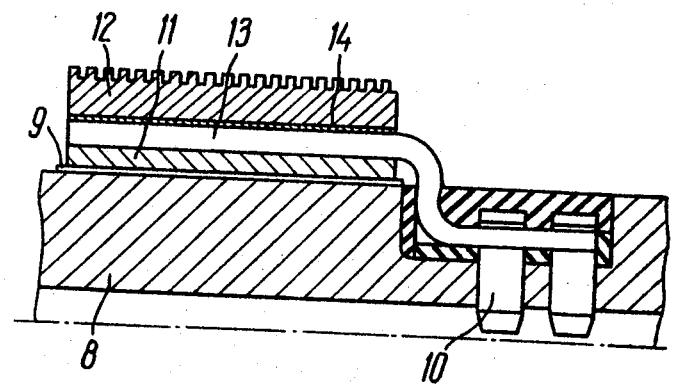
FIGS. 3 and 4 show schematically a contact device with a cylindrical distributing ring, constructed in accordance with the second embodiment of the present invention.
Figure 4:
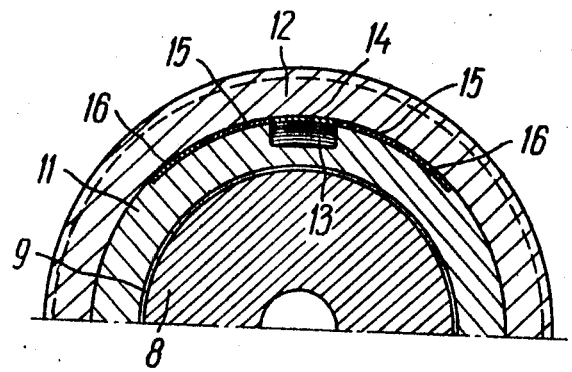

In high-power electric machines, where excitation currents are of high magnitudes, it is expedient for the contact surface between the two rings, i.e. between the slip ring and the distributing ring, to be of a maximal possible area. In this case, according to another embodiment of the present invention, shown in FIGS. 3 and 4, the distributing ring 11 is shaped as a hollow cylinder, and the slip ring 12 is received coaxially thereabout.

The periphery of the distributing ring 11 has made therein a groove to disposed adjacent to the slip ring 12, this groove fixedly receiving thereinside the current conducting bar 13. Mounted intermediate of the rings 11 and 12, at both sides of the current conducting bar 13, are gaskets 14, 15 and 16. The conductivity of the respective materials of the gaskets increases from the gasket 14 to the gasket 16.

The operation of the last-mentioned embodiment of the present invention and the general structure thereof are in every other respect similar to those previously described in connection with the first embodiment of the present invention.

In both embodiments of the present invention, which have been described hereinbefore, the total extent of the gaskets 5, 6 and 7 (14, 15 and 16 of the second embodiment) is less than half the circumferential extent of the distributing ring 2 or 11.

We claim:

1. A contact device for an electric machine including a rotor shaft, said device comprising: a slip ring adapted to be carried by the rotor shaft of said electric machine, a distributing ring mechanically connected with said slip ring, a current conducting bar secured to said distributing ring, electrically conductive gasket means disposed intermediate said slip ring and said distributing ring, said gasket means extending symmetrically in opposite directions from both sides of a center line of said current conducting bar, the circumferential extent of said gasket means being less than half the circumferential extent of the adjacent side of said distributing ring, said gasket means including a plurality of segments having respectively different conductivities increasing in opposite directions from said line.

* * * * *